United States Patent
Kreidler

[11] 3,903,836
[45] Sept. 9, 1975

[54] STANDARD INDICATING DEVICE FOR VEHICLES WITH UNIVERSAL MOUNTING SYSTEM THEREFOR

[75] Inventor: Alfred Kreidler, Zurich, Switzerland

[73] Assignee: Metall-Invent S.A., Zug, Switzerland

[22] Filed: Sept. 19, 1973

[21] Appl. No.: 398,862

[30] Foreign Application Priority Data
Sept. 19, 1972 Germany............................ 2245857

[52] U.S. Cl.................... 116/129 R; 58/56; 73/431; 248/27
[51] Int. Cl........................ G09f 9/00; G04b 39/14
[58] Field of Search....... 116/129 R, 129 T; 73/431; 58/56; 248/114–115, 27

[56] References Cited
UNITED STATES PATENTS

| | | | |
|---|---|---|---|
| 1,428,902 | 9/1922 | Porter | 58/56 |
| 1,479,627 | 1/1924 | Porter | 58/56 |
| 2,628,469 | 2/1953 | Morrow | 58/56 X |
| 2,694,285 | 11/1954 | Hickey | 116/129 R X |
| 2,700,272 | 1/1955 | Trichel | 58/56 X |
| 2,700,283 | 1/1955 | Schaaf, Jr. | 58/56 X |
| 3,233,299 | 2/1966 | Godel | 248/27 X |
| 3,241,794 | 3/1966 | Little | 248/27 |

Primary Examiner—Jerry W. Myracle
Assistant Examiner—Daniel M. Yasich
Attorney, Agent, or Firm—Pugh & Laiche

[57] ABSTRACT

The invention provides an indicating device such as a clock which can be mounted in different types of motor vehicles. The device comprises a standard member in the form of a housing to which different closure members can be fitted to enable the device to be fitted in different vehicles. Preferably the housing contains the means for operating the device, such as a clock mechanism, and one closure member forms a dial. The closure member may contain indicating means such as clockhands and may be covered by a transparent shield.

9 Claims, 5 Drawing Figures

STANDARD INDICATING DEVICE FOR VEHICLES WITH UNIVERSAL MOUNTING SYSTEM THEREFOR

BACKGROUND OF THE INVENTION

The invention relates to an indicating device such as a clock and particularly an electric clock for installation in motor vehicles.

As is well known, car clocks are of a different construction and are installed in a car dashboard in different ways for different vehicle types, partly owing to technical reasons and partly owing to reasons of taste. This variety increases the production cost of these clocks, since they can only be made in relatively small numbers, which hinders storage and sales.

The invention proposes to provide a uniform basic construction of a device such as a car clock with modification possibilities according to type.

According to the invention there is provided as indicating device as hereinafter defined for a vehicle comprising a housing adapted to receive different closure members whereby the device can be fitted to different vehicles.

The reduction in cost, which is attained by the introduction of uniformity, is assisted by the fact that according to the invention, the uniform basic member or housing directly incorporates the operating parts of the device, and thus dispenses with bedplates and similar support parts. Furthermore the dimensions of the basic member can be kept so small that it can even be installed in a restricted space with appropriate closure members.

The basic member or housing is advantageously in the form of a receptacle, comprising a partition on one or both sides of which the operating parts of the device are secured or mounted, a second mounting thereby being provided in the closure member on the same side.

The front closure member, which is of a different design depending on the motor vehicle type, carries indication means and/or means such as a ring for supporting a sight shield. The part carrying the indication means can be provided with typical connection members.

It is a logical continuation of the invention for the rear closure part to be constructed as a cover or capsule, and the means for securing the device to the dashboard are disposed on this member and if desired electrical connection means, depending upon the requirements of the vehicle type in question.

BRIEF DESCRIPTION OF THE DRAWINGS

Specific embodiments of the invention will now be described by way of example with reference to the accompanying drawings in which.

DESCRIPTION OF THE PREFERRED EMBODIMENT

Figure 1:
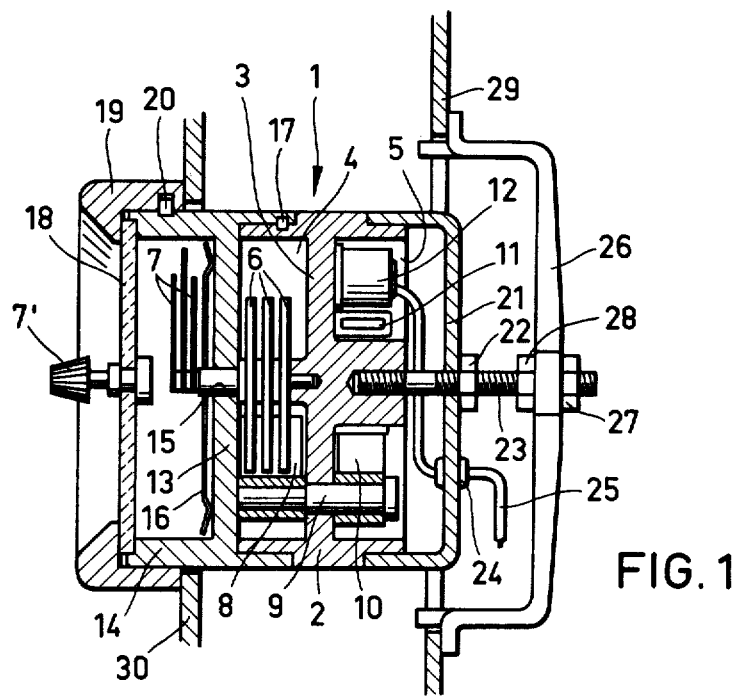
FIGS. 1 to 3 show a longitudinal section in each case of a first embodiment of a car clock according to the invention comprising a uniform basic member in three modified forms.

Referring to FIG. 1, one embodiment includes a basic member 1 comprising a housing 2 in the form of a receptacle, which is sub-divided into front and rear portions by a partition 3 into two compartments 4 and 5, open at the front and rear respectively. The front compartment 4 contains the driving mechanism for the indicating means which are in the form of hands mounted on a shaft, the driving mechanism comprising three drive wheels 6 for the set of hands 7 consisting of the second, minute and hour hands. The front compartment 4 also contains stepping members 8 for advancing the three drive wheels 6. A shaft 9 for these wheels extends through the partition 3 into the rear compartment 5 wherein a lever 10 for the armature, not shown, of an electro-magnet 11 is mounted on said shaft 9. Further electrical or electronic members 12 of the clock timing mechanism are located in compartment 5.

The open side of the front compartment 4 is closed by a cylindrical closure member 14 in the modification according to FIG. 1. The base 13 of the closure member 14 has a central bore 15 which receives the concentrically disposed shafts of the hands 7. The side of the base remote from the housing forms the clock face 16, which as is standard and well known has indicating indicia thereon in order to indicate time by means of the relative positions of the clock hands 7. The front closure member 14 is connected to the housing 2 by a bayonet lock 17. A bayonet lock, as is well known, is one type of a two element, mating locking system, having a male projecting member which mates with a female indentation. The compartment carrying the hands 7 and the clock face 16 is closed by a sight shield 18, held in place by a front ring 19, which ring 19 is held in position by a bayonet lock 20 on the front closure member 14. The front ring 19, as can be seen in the drawings, provides about its periphery a lip ring or flange which mates with the exterior side of the periphery of an aperture in the dashboard, and thereby under compression connects the front of the housing 2 to the front wall 30 of the dashboard. An adjustment button 7' for the hands is disposed in the center of the sight shield 18. The sight shield 18, as is well known, is transparent to allow viewing of the clock face 16. The adjustment button 7', as is well known and standard, includes appropriate structure (not illustrated) for setting the initial positions of the hands 7, the structure forming no part of the present invention.

The rear compartment 5 of the basic member 1 is closed by a cover 21 in the form of a cap, which is held firmly by a nut 22 on a stay bolt 23, inserted centrally in the basic member 1. An electric lead 25 is taken through an aperture 24 in the cover 21.

A clamp 26 is further held in position on the stay bolt 23 between an adjusting nut 27 and a counter-nut 28. The clamp 26 enables the clock to be positioned in the front wall 30 of a dashboard by virtue of its engagement in the rear wall 29 of the dashboard.

As can be seen in the drawings, the housing 2 is formed of a cylindrical member having a raised plateau portion at its central, exterior area with respect to its front and rear portions, forming vertical shoulders therewith, the front and rear portions likewise being cylindrical members concentric with the central plateau but having lesser diameters. As illustrated, the partition or plate 3 is laterally disposed in a radial plane across the housing 2. As shown, the front closure element by means of the peripheral edges of its base 13 and the rear closure element by means of the peripheral edges of cover 21 form a continuous, smooth exterior surface with the central raised plateau portion of the housing 2, the peripheral edges mating with and butting against the vertical shoulders of the central raised plateau portion.

Figure 2:
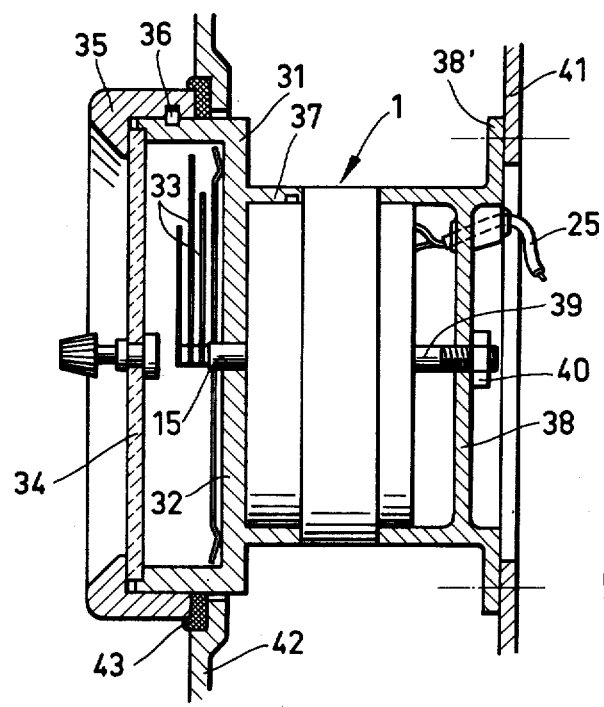

In a modification shown in FIG. 2 a closure member 31, of a considerably greater diameter than the closure member 14 in the embodiment described with reference to FIG. 1 is provided for closing the front compartment of the hands 33, as well as the sight shield 34 and front ring 35 with its bayonet lock 36 are correspondingly enlarged. On the other hand the dimensions of the bayonet lock 37 on the rear end of the closure member 31 are substantially as those in closure member 14.

In this modification the rear cover 38 and the passage of the electric lead 25 is of a somewhat different construction. The cover 38 is held in position by a shorter stay bolt 39 with a nut 40. The cover 38 also comprises an outwardly directed flange 38', by which it is screwed or bolted to the rear wall 41 of a dashboard, the entire clock with the front ring 35 thereby being disposed within an elastic ring 43 in the front wall 42 of the dashboard.

Figure 3:
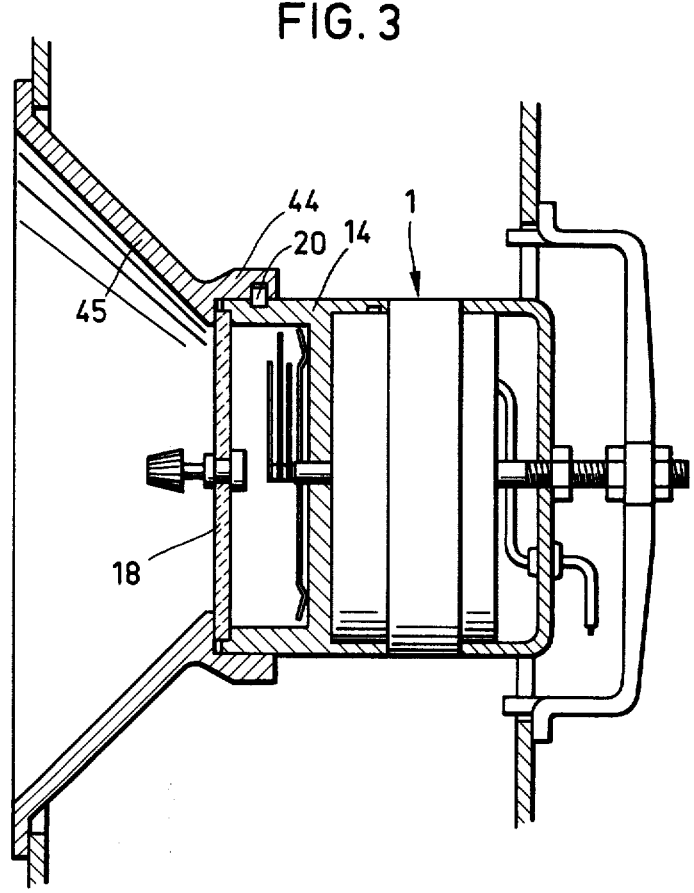

The modification according to FIG. 3 is only distinguished from that according to FIG. 1 by the fact that the front ring 19 is in this case replaced by a front ring 44, which has a frusto-conical extension 45 for recessed installation in a dashboard.

Figure 4:
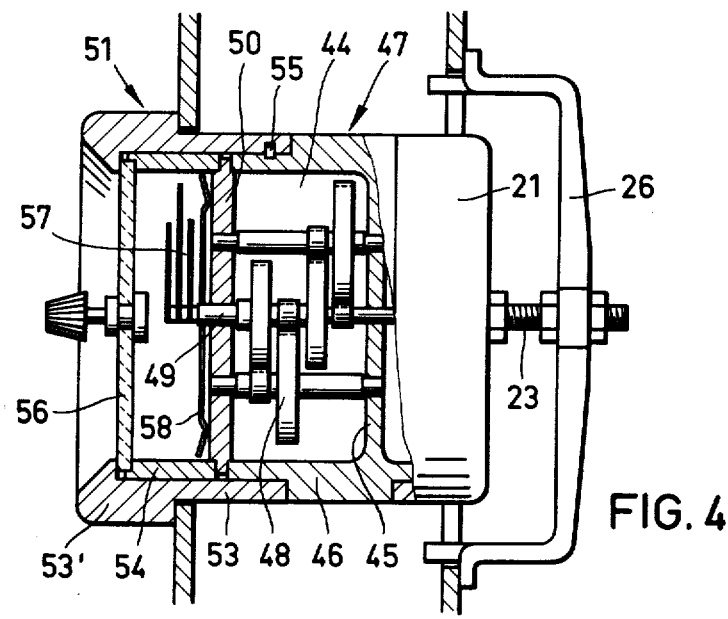
FIGS. 4 and 5 show a second embodiment of a car clock comprising a different clock mechanism in two modified forms.
Figure 5:
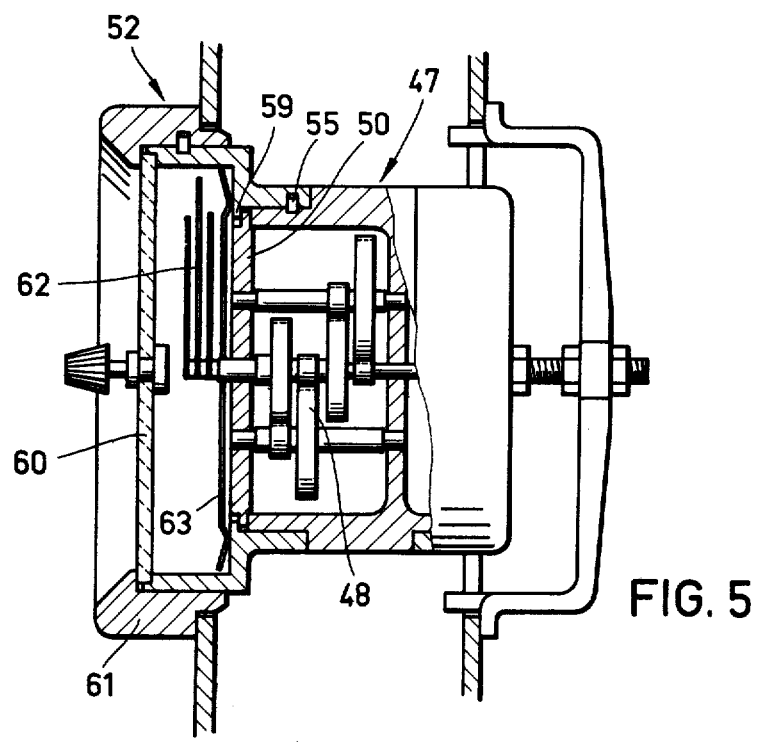

In the embodiment according to FIGS. 4 and 5 a clock mechanism 48 for driving the hands of the clock is accommodated in a front compartment 44 of a housing 46, which is divided by a partition 45. Shafts 49 for the hands are mounted centrally and coaxially within each other and the reduction effected by the clock mechanism 48, from the point of view of the second hand, is, as is well-known, 1:60 and 1:720. The shafts of the clock mechanism 48 are journalled in the partition 45, and in a front plate 50, the latter of which is located non-rotatably in the housing and closes the compartment 44.

The front plate 50 is held by a front closure member 51 as shown in FIG. 4 or 52 as shown in FIG. 5.

As shown in FIG. 4, the closure member 51 substantially consists of a jacket 53, which is integral with a front ring 53' and a distance piece 54. The jacket 53 is secured on the basic member 47 by a bayonet lock 55, a sight shield 56 being located between the front ring 53' and the distance piece 54, and the front plate 50 located between the distance piece 54 and the housing 46 whereby the plate 50 is firmly held in position. The time indication means, namely the hands 57' and the clock face 58, are located within the closure member 51.

As shown in FIG. 5, the front closure member 52 is of considerably greater diameter than the closure member 51 shown in FIG. 4. The closure member 52 comprises an inner collar 59, by means of which the front plate 50 is held in position, when the closure member 52 is connected to the housing 46 by the bayonet lock 55. On the other hand the sight shield 60 is only held in place by a simple front ring 61. In conformity with the larger diameter of the closure member 52, the hands 62 are longer and the clock face 63 is of a larger size.

Special mention of the advantages of the bayonet locks illustrated in all the various embodiments is hardly required; by means of these locking members the car clock in question can be assembled as desired, without difficulty in the shortest possible time.

Thus, as is clear from the foregoing, the basic member 1 forms a standard, universal indicating device which by a proper selection and attachment of an appropriate one of the front closure elements and an appropriate one of the rear closure elements, can be attached to different sized and configured dashboards.

Many further modifications are of course possible, as desired, within the frame work of the invention, apart from those illustrated. The essential feature in every case is that the same basic member 1,47, containing the clockwork movement, is always utilized.

Although the present invention relates particularly to car clocks, it can also be applied to other devices and meters, suitable for installation in motor vehicles such as speedometers and revolution counters. Such devices and meters including clocks are referred to herein as "indicating devices".

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A universal indicating device and mounting system therefor for vehicles and the like having a dashboard comprising:

a standard indicating device for vehicles and the like, such as for example a car clock, including a housing having front and rear portions with a plate therebetween and operative means, such as for example a car clock mechanism, for operating the device mounted within said housing and secured to said plate, said operative device including rotatably movable indicating means, such as for example clock hands, on a shaft, said housing further including front locking means in its front portion for attaching a front closure element to said housing for connecting said front portion of said housing to the dashboard, said locking means including one element of a two element, mating locking system; and a set of different front closure elements adapted for selection for mounting to said housing and having substantially different configurations and sizes but each having a rear portion which conforms to the front portion of said housing and each having complementary front housing locking means which includes the other element of said two element, mating locking system for mating in locking engagement with said front locking means, each said front closure element having a transparent shield for covering said indicating means for the viewing thereof and closing off the open front end of the selected front closure element of the housing when mounted to said housing, said indicating means mounted beneath said transparent shield and each including front dashboard mounting means for mounting it and hence said housing to the front of the dashboard; whereby said standard indicating device can be mounted to differently sized and configured dashboards without any change in the device itself but only with selecting and mounting the appropriate one of said front closure elements.

2. The system of claim 1 wherein said housing further includes:

rear locking means in its rear portion for attaching a rear closure element to said housing for connecting said rear portion of said housing to the dashboard, said rear locking means including one element of a two element, mating locking system; and a set of different rear closure elements adapted for selection for mounting to said housing and having substantially different configurations and sizes but each having a front portion which conforms to the rear portion of said housing and each having complementary rear housing locking means which includes the other element of said two element, mating locking system for mating in locking engagement with said rear locking means, and each including rear dashboard mounting means for mounting it and hence also said housing to the dashboard, supplemental to and coacting with said front dashboard mounting means; whereby said standard indicating device can be connected to differently sized and configured dashboards without any change in the device itself but only with selecting and connecting the appropriate ones of said front and rear closure elements.

3. The system of claim 2 wherein said housing is open at both its front and rear portions to form compartments, and each said rear closure elements can serve as a cover for the open rear portion of said housing, closing the rear compartment.

4. The system of claim 2 wherein said housing has a central, exterior area forming a raised plateau portion with respect to its front and rear portions forming vertical shoulders therewith, each said front closure elements and said rear closure elements having peripheral edges at their rear and front portions, respectively, which mate with and abut against said plateau portion of said housing.

5. The system of claim 4 wherein the edges of said closure elements and said plateau portion form a continuous, smooth exterior surface.

6. The system of claim 4 wherein said central plateau comprises a cylindrical member with said plate being laterally disposed in a radial plane across said member, said front and rear portions also being cylindrical members concentric with said central plateau but having lesser diameters.

7. The system of claim 1 wherein said two element locking system comprises a bayonet type locking system.

8. The system of claim 1 wherein each of said set of front closure elements includes a base member under said transparent shield which is laterally disposed across said housing and has a centrally located bore through which is received the shaft of said indicating means, the side of the base remote from said housing serving as a dial having indicating indicia thereon which is related to the relative position of said indicating means.

9. The system of claim 8 wherein each of said set of front closure elements further includes a front ring member located on the opposite side of the base from said transparent shield, said front ring member having a peripheral lip ring flange means for mating with the exterior side of the periphery of an aperture in the dashboard, said lip ring flange means constituting at least in part said front dashboard connection means.

* * * * *